United States Patent
Fischer et al.

(10) Patent No.: US 7,044,191 B2
(45) Date of Patent: May 16, 2006

(54) MOLD MATERIAL PROCESSING DEVICE, METHOD AND APPARATUS FOR PRODUCING SAME

(75) Inventors: Jonathon Fischer, Oakville (CA); Dan Zuraw, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 180 days.

(21) Appl. No.: 10/276,962

(22) PCT Filed: May 25, 2001

(86) PCT No.: PCT/IB01/01710

§ 371 (c)(1),
(2), (4) Date: Apr. 11, 2003

(87) PCT Pub. No.: WO02/28615

PCT Pub. Date: Apr. 11, 2002

(65) Prior Publication Data
US 2004/0011495 A1    Jan. 22, 2004

(30) Foreign Application Priority Data
May 24, 2000 (DE) .............................. 100 25 588

(51) Int. Cl.
*B22D 19/00* (2006.01)

(52) U.S. Cl. .......................... 164/112; 164/46; 164/98; 164/99; 164/100; 164/105; 29/527.2; 29/DIG. 39; 425/547; 427/456; 427/455

(58) Field of Classification Search ................ 425/547; 427/46, 455, 456; 29/527.2, DIG. 39; 164/6, 164/15, 19, 46, 98, 99, 100, 101, 102, 103, 164/104, 105, 106, 107, 108, 109, 110, 111, 164/112

See application file for complete search history.

(56) References Cited

U.S. PATENT DOCUMENTS

| | | | |
|---|---|---|---|
| 2,629,907 A * | 2/1953 | Hugger ......................... | 164/14 |
| 2,747,070 A * | 5/1956 | Bargehr ...................... | 219/540 |
| 2,875,312 A * | 2/1959 | Norton ........................ | 219/535 |
| 2,890,318 A * | 6/1959 | Kruse .......................... | 219/540 |
| 2,987,300 A * | 6/1961 | Greene ........................ | 165/169 |
| 3,387,653 A * | 6/1968 | Coe ............................. | 165/165 |
| 3,784,152 A * | 1/1974 | Garner et al. ................. | 249/80 |

(Continued)

FOREIGN PATENT DOCUMENTS

EP    0 312 029 B1    5/1994

(Continued)

*Primary Examiner*—Joseph Del Sole
*Assistant Examiner*—G. Nagesh Rao
(74) *Attorney, Agent, or Firm*—Medler Ferro PLLC (57) ABSTRACT

The invention relates to a molten material processing device having an elongated thermal element like a heating element, a thermocouple, a sensor, a heatpipe and a cooling pipe which is characterised in that said elongated thermal element (2) is located in a recess (3) provided in a surface (6) of the molten material processing device (1), the recess (3), comprising a first portion (4) and a second portion (5), has a cross-section which is larger than a cross-section of the thermal element (2), so as to provide a clear space (7) between the thermal element (2) and the surface (6) of the processing device (1), the clear space (7) which is limited by the first portion (4) and the thermal element (2) is filled by a thermally sprayed material (8) and the second portion (5), which is adapted to the cross-section of the thermal element (2), partially surrounds and directly contacts same.

23 Claims, 7 Drawing Sheets

U.S. PATENT DOCUMENTS

| | | | |
|---|---|---|---|
| 4,557,685 A | 12/1985 | Gellert | |
| 4,635,851 A | 1/1987 | Zecman | |
| 4,688,622 A * | 8/1987 | Gellert | 164/61 |
| 4,726,412 A * | 2/1988 | Magnan et al. | 164/19 |
| 4,808,490 A | 2/1989 | Tsukuda | |
| 4,975,038 A * | 12/1990 | Delalande | 425/543 |
| 5,051,086 A | 9/1991 | Gellert | |
| 5,225,662 A * | 7/1993 | Schmidt | 219/421 |
| 5,226,596 A | 7/1993 | Okamura | |
| 5,227,179 A * | 7/1993 | Benenati | 425/547 |
| 5,261,806 A * | 11/1993 | Pleasant | 425/144 |
| 5,266,023 A | 11/1993 | Renwick | |
| 5,468,295 A * | 11/1995 | Marantz et al. | 118/723 DC |
| 5,503,545 A | 4/1996 | Benenati | |
| 5,539,857 A * | 7/1996 | McGrevy | 392/484 |
| 6,447,704 B1 * | 9/2002 | Covino | 264/219 |
| 6,486,447 B1 * | 11/2002 | Miyata | 219/444.1 |
| 6,544,027 B1 | 4/2003 | Yu | |
| 6,871,830 B1 * | 3/2005 | Covino | 249/135 |
| 2003/0098140 A1 | 5/2003 | Yu | |
| 2004/0149417 A1 * | 8/2004 | Roche et al. | 164/46 |
| 2004/0219383 A1 * | 11/2004 | Roche et al. | 428/553 |
| 2004/0238146 A1 * | 12/2004 | Zhang et al. | 164/46 |

FOREIGN PATENT DOCUMENTS

| | | |
|---|---|---|
| EP | 0 750 974 B1 | 9/1999 |
| EP | 1 024 939 B1 | 1/2002 |

* cited by examiner

MOLD MATERIAL PROCESSING DEVICE, METHOD AND APPARATUS FOR PRODUCING SAME

The present invention relates to a molten material processing device having an elongated thermal element, such as a heating element, a thermocouple, a sensor, a heatpipe and/or a cooling pipe. The invention relates further to a method and apparatus for producing the molten material processing device.

Such a molten material processing device is known from U.S. Pat. No. 5,051,086.

Thermal elements like for example heating elements are used in the molten material processing device so as to provide the heat required to raise the temperature in the processing device to a process temperature and to maintain said temperature.

Because of the short cycle times to be realised in modern injection molding systems it is important that the processing device has an excellent temperature time response. The heating element must therefore rapidly and uniformly transfer heat to the body of the processing device. Moreover, the connection between the heating element and the processing device must be sufficiently firm to withstand the mechanical forces acting upon the processing device and the heating element during the molding process. The same applies to other thermal elements such as thermocouples, sensors or heating/cooling pipes regardless whether heat is transferred to or from the thermal element.

The above mentioned U.S. Pat. No. 5,051,086 describes a molten material processing device in form of an injection molding nozzle. Said device has an elongated thermal element like a heating element which is wound directly around the body of the nozzle. The coils of the heating element are integrally cast in a nickel-alloy by a brazing step in a vacuum furnace. The brazing step results in that the nickel-alloy flows into all of the spaces around the coils thereby metallurgically bonding the coils to the body of the nozzle. In order to insulate an outer portion of the coils of the heating element which faces to the outside of the nozzle, the coils are covered by plasma sprayed alternating layers of stainless steel and a ceramic insulating material.

U.S. Pat. No. 4,557,685 proposes an injection molding nozzle having a spiral channel around its cylindrical outer surface. A helical heating element is integrally brazed into this channel wherein the brazing takes place in a vacuum furnace. The solder, in this case a nickel-paste, melts and runs by capillary action into the channel all around the heating element thereby bonding both the heating element and the channel and forming an integral construction.

Both US Patents referenced above bond the heating element to the body of the nozzle by brazing together both parts in a vacuum furnace. However, the use of such a vacuum furnace is costly and lowers the production rate.

U.S. Pat. No. 5,226,596 to Okamura proposes a heated nozzle having a spiral shaped groove on its outer periphery which receives a heating element. The groove and the heating element are covered by a metal strip wound around the surface of the outer periphery of the heated nozzle main body. Said metal strip is welded to the nozzle body. However, such a construction creates air filled empty spaces between the metal strip and the heating element thereby partially insulating the surface of the heating element. As a result the temperature of the heating element undesirably increases in said insulated spots which can destroy the heating element.

It is an object of the present invention to provide a reliable molten material processing device having an elongated thermal element which can be produced fast and at reduced costs. It is a further object of the invention to provide a method which is easy to automate and an apparatus to carry out said method.

It is an advantage of the inventive device that a vacuum furnace is not required for its production. Thereby the production rate can be increased and the production costs can be lowered. Moreover the heat transfer from the heating element to the body of the processing device is further improved because both parts are now in direct contact with each other thereby achieving an optimal effect. Hence the temperature time response of the inventive device is further enhanced so that shorter cycle times are possible.

The inventive method can easily be automated which advantageously reduces the production costs. The inventive method further offers the possibility to use a plurality of different materials with different melting points for the thermal spraying. Finally, the heating element and the processing device are only heated to a small extent in the vicinity of the heating element during the bonding such that no detortion occurs, which could influence the contact and thus the heat transfer between the heating element and the processing device.

The processing device can be an injection nozzle, a mold manifold, a mold gate insert, a nozzle tip, a valve stem, a torpedo, a heater body or a sprue bushing. The recess provided in the surface of the processing device is preferably a groove.

The first portion of the recess can be a V-shaped opening. This configuration facilitates and improves the filling of the clear space between the thermal element and the surface of the processing device. In a preferred embodiment, the opening angle of the first portion is in a range of 30° to 120°.

In another preferred embodiment, the cross-section of the second portion is arcuate such that the cross-section of the second portion is adapted to the cross-section of a tubular thermal element like a heating element or a heating/cooling pipe. The angle by which the second portion surrounds the thermal element is in a preferred embodiment 180° so that a maximum area of the thermal element is in direct contact with the processing device. The angle can of course also be smaller than 180°.

Preferably, a groovelike recess is formed in at least one wall of the groove parallel to the bottom thereof. This groovelike recess advantageously acts as a spring when pressing the thermal element into the groove. The groovelike recess can be formed in the first portion of the groove. Further, the groovelike recess can be symmetrically formed in opposite walls of the groove.

Preferably, the thermal sprayed material is a heat conductive material. The material can be any of aluminum, bronze, copper, nickel or alloys thereof.

According to a preferred embodiment of the inventive method, the thermal spraying is performed in the form of plasma spraying. Advantageously, initial materials having high melting points can be processed, as the temperature of the plasma beam is high enough to melt such materials. In another preferred embodiment of the inventive method, the thermal spraying can be performed as arc spraying. The advantage of this embodiment consists in that the initial material can easily be made available in wire form. Finally it is possible to effect the thermal spraying as flame spraying.

Preferably, the surface in which the thermal element is embedded, is processed to be plane. This can be done by milling, lathing and/or grounding. In a preferred embodiment the clear space is filled with material by thermally spraying alternating layers onto the thermal element. Thereby a uniform filling of the clear space is achieved. The adherence of the thermally sprayed material to the surface of the heating element and to the surface of the recess can be improved by cleaning said surfaces prior to the filling.

Figure 1:
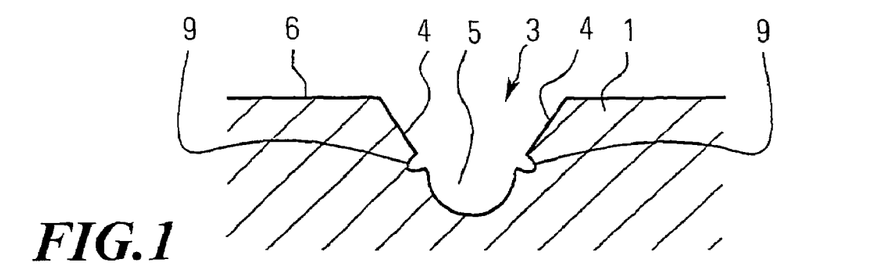
FIG. 1 a cross-section through a part of an embodiment of the inventive processing device.

Following, the invention is explained in more detail by means of embodiments with regard to the attached drawing wherein shows:

FIG. 1 shows one part of an embodiment of the processing device 1 which can be an injection nozzle, a mold manifold, a mold gate insert, a nozzle tip, a sprue bushing, a valve stem, a torpedo and a heater body. This processing device can be used in the molding process of various materials such as plastic resins, metals and powders.

FIG. 1 shows in particular the part of the embodiment of the processing device 1 in the area of a recess 3, which is formed in at least one surface 6 of the processing device 1. Said recess 3 extends along the surface 6 into the areas of the processing device 1 to be heated. A heating wire can, for instance, be used as thermal element 2, which is adjusted to the progress of the recess 3 along the surface 6. Although only one recess 3 formed in one surface 6 is illustrated in FIG. 1, of course, additional recesses in other surfaces of the processing device 1 can be formed.

In this embodiment, the recess 3 is formed as a groove which is most suitable to receive tubular thermal elements such as heating pipes, cooling pipes or heating elements in form of heating wires. The recess 3 can have any other form suitable to receive other non-tubular thermal elements. FIG. 1 shows that the recess 3 has a cross-section which is larger than the cross-section of the thermal element 2 shown in FIG. 2. The recess comprises a first portion 4 and a second portion 5. The first portion of the recess realised by this embodiment is a V-shaped opening which facilitates the thermal spraying of the material 8 onto the thermal element 2. Moreover, said V-shaped opening also facilitates the insertion of the thermal element 2 into the recess 3. The second portion 5 has an arcuate cross-section which is adapted to the cross-section of the thermal element 2. In this case, the second portion 5 surrounds the thermal element by the maximal possible angle of 180°. Any other angle which is less than 180° is also possible.

Furthermore it can be seen from FIG. 1 that two groovelike recesses 9 are formed in the walls of the recess 3. Said groovelike recesses 9 extend parallel to the bottom of the recess 3 and act as a spring when the thermal element 2 is pressed into the recess 3 during the mounting of the element 2. In this embodiment, the groovelike recesses 9 are symmetrically arranged in opposite walls of the first portion of the recess 3. Other arrangements for example with only one groovelike recess 9 are likewise possible.

Figure 2:
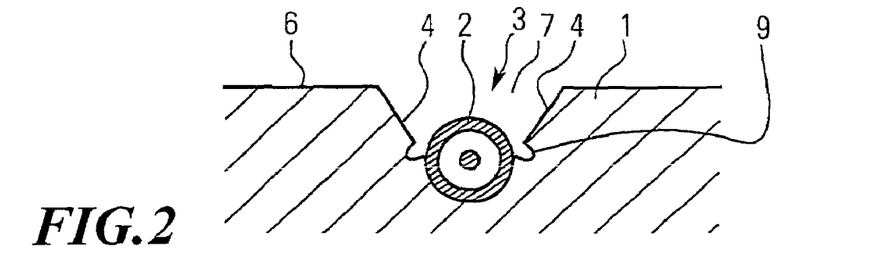
FIG. 2 a cross-section through the part of the embodiment after the heating element was inserted into the recess.

According to FIG. 2 the thermal element 2 is inserted into the recess 3. It can be seen in FIG. 2 that by inserting the thermal element 2 into the recess 3, a clear space 7 is formed between the surface 6 of the processing device 1 and the thermal element 2. By means of the V-shaped opening of recess 3, the clear space 7 is expanded towards the surface 6 such that the thermal element 2 is well accessible. Thus, spraying the material 8 onto the thermal element 2 is facilitated.

Figure 3:
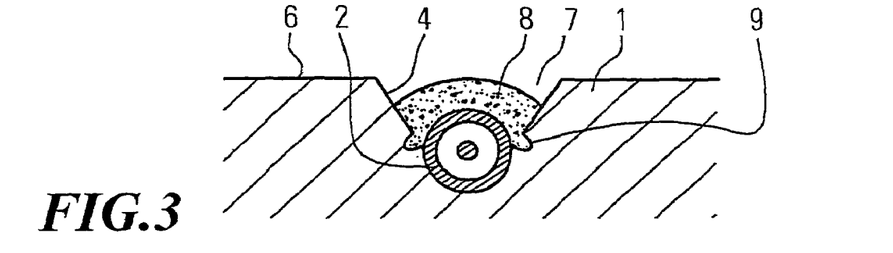
FIG. 3 a cross-section through the part of the embodiment wherein the clear space is partially filled with thermally sprayed material.

FIG. 3 illustrates the clear space 7 partially filled with material 8 by thermal spraying. Hot particles of the material 8 are accelerated towards the clear space 7, which particles impact at high speed on the free surface, i.e. the surface of the thermal element 2 facing the clear space 7. Thus, the material 8 is sprayed onto the thermal element 2 until the clear space 7 is filled. The hot particles are not shown in FIG. 3. Advantageously, the material 8 is sprayed on the thermal element 2 layer by layer such that the clear space 7 is filled uniformly. The material 8 thereby solidifies to form a layer completely covering the thermal element 2, onto which additional layers are sprayed one by one until the clear space 7 is completely filled. The V-shaped opening of the recess 3 allows a larger amount of material 8 to reach the clear space 7 in order to be deposited on the heating element.

Figure 4:
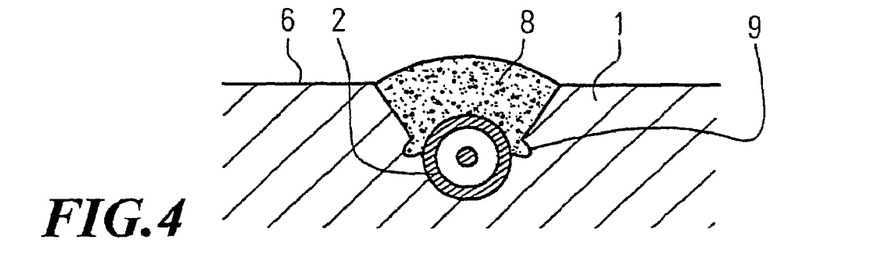
FIG. 4 a cross-section through the part of the embodiment after the clear space between the surface and the heating element is completely filled with thermally sprayed material.

FIG. 4 illustrates a clear space 7 completely filled with thermally sprayed material 8. The solidified layers sprayed onto the thermal element 2 adhere to both the free surface of thermal element 2 and to the wall of the V-shaped opening 7 of recess 3. The thermal element 2 is thereby fixed in the recess 3 such that the required solid compound and the required good heat transmission between the processing device 1 and the thermal element 2 are guaranteed. In order to improve the adherence of the solidified thermally sprayed material 8 on the thermal element 2 and on the walls of the recess 3, the surfaces of the thermal element 2 and the wall contacting the material 8 can be cleaned prior to spraying. The cleaning can, for instance, be effected by means of sand blasting.

Figure 5:
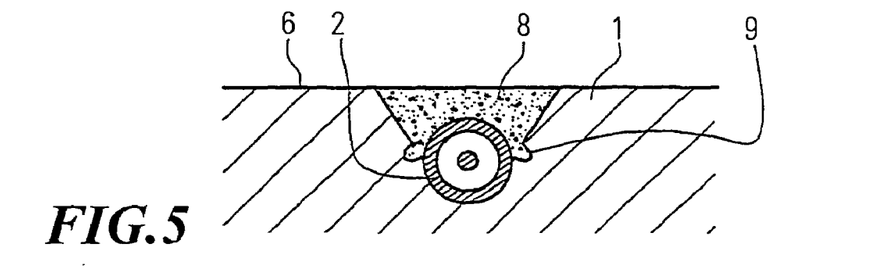
FIG. 5 a cross-section through the part of the embodiment after the surface is ground to be plane.

Although it has shown that the layer-wise filling of the clear space 7 entails excellent results, other ways of proceeding for the filling are possible. After filling the clear space 7, the surface 6 of the processing device 1 is processed to be plane, then having the form as it is shown in FIG. 5.

A heating wire can be used as heating element, the core of which is formed by a heat conductor. Said heat conductor being current-carrying during the heating operation is enclosed by an insulating layer, which again is enclosed by a tubular heating element. Said tubular heating element forms the upper surface of the thermal element 2, onto which the hot particles are sprayed at high speed. The tubular heating element can, for instance, be made of steel.

Other elements can be used as the elongated thermal element 2 such as a sensor, a thermocouple, a heating pipe and a cooling pipe.

Figure 6:
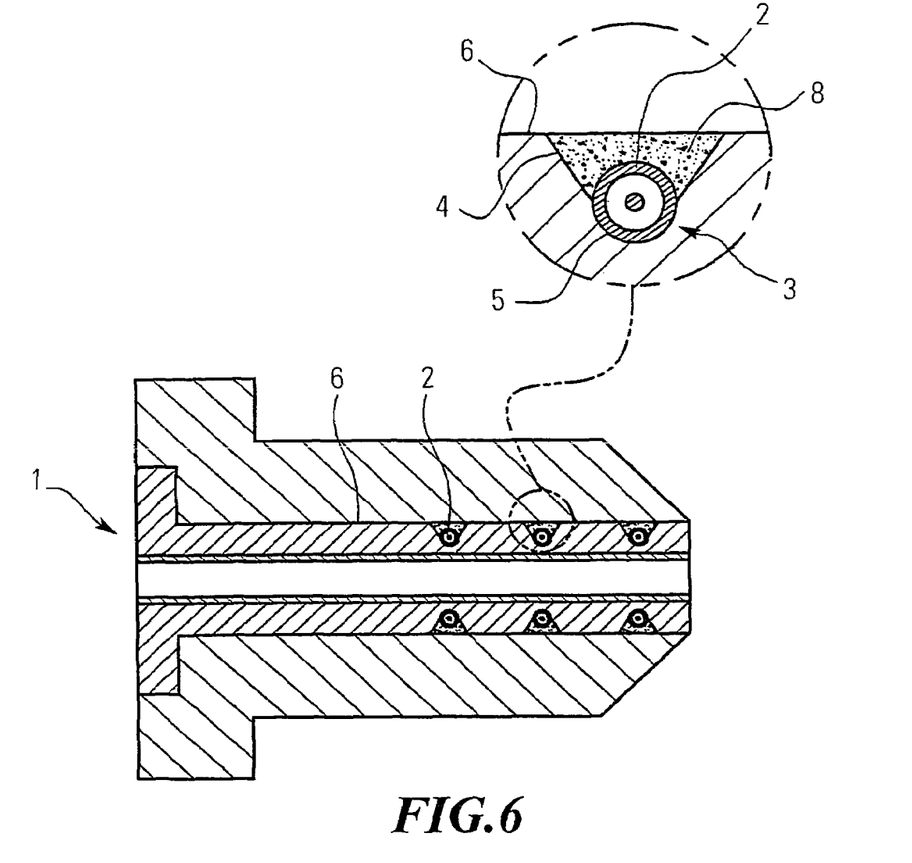
FIG. 6 a partially enlarged cross-section through another embodiment of the inventive processing device.
Figure 7:
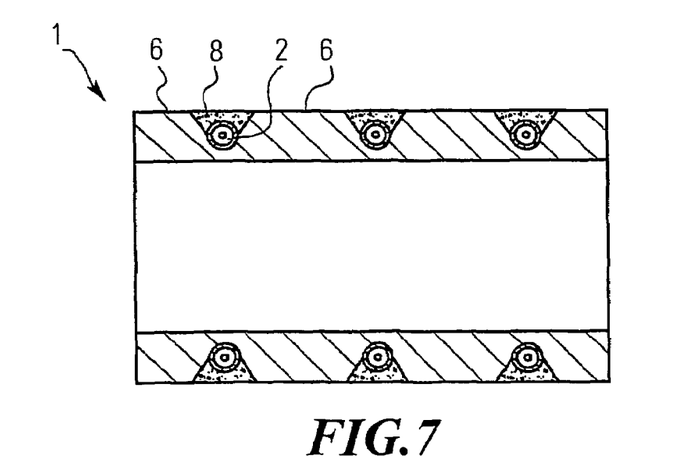
FIG. 7 a cross-section through a further embodiment of the inventive processing device.
Figure 8:
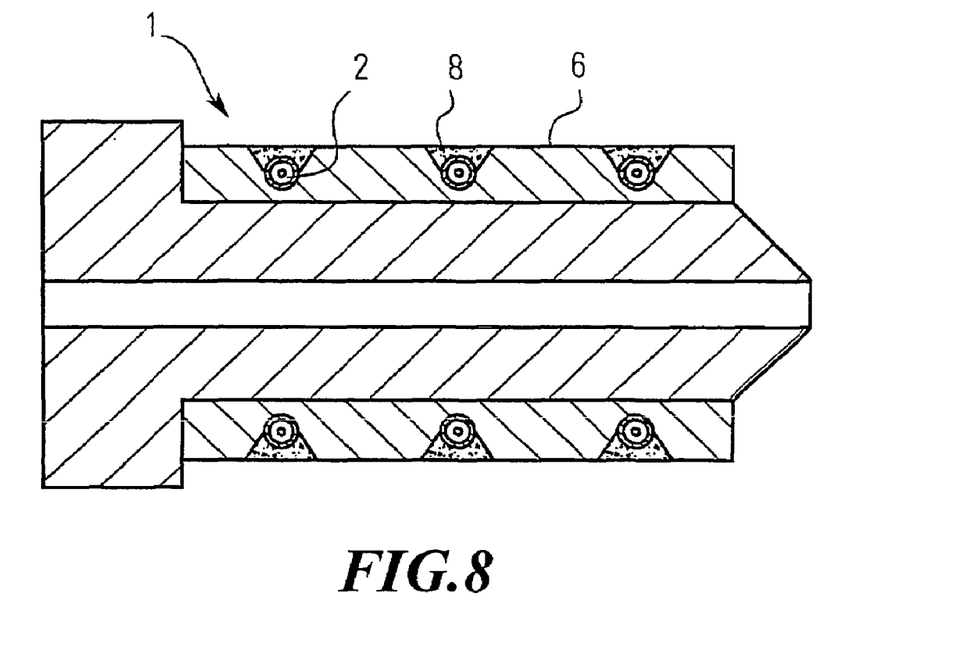
FIG. 8 a cross-section through another embodiment of the inventive processing device.
Figure 9:
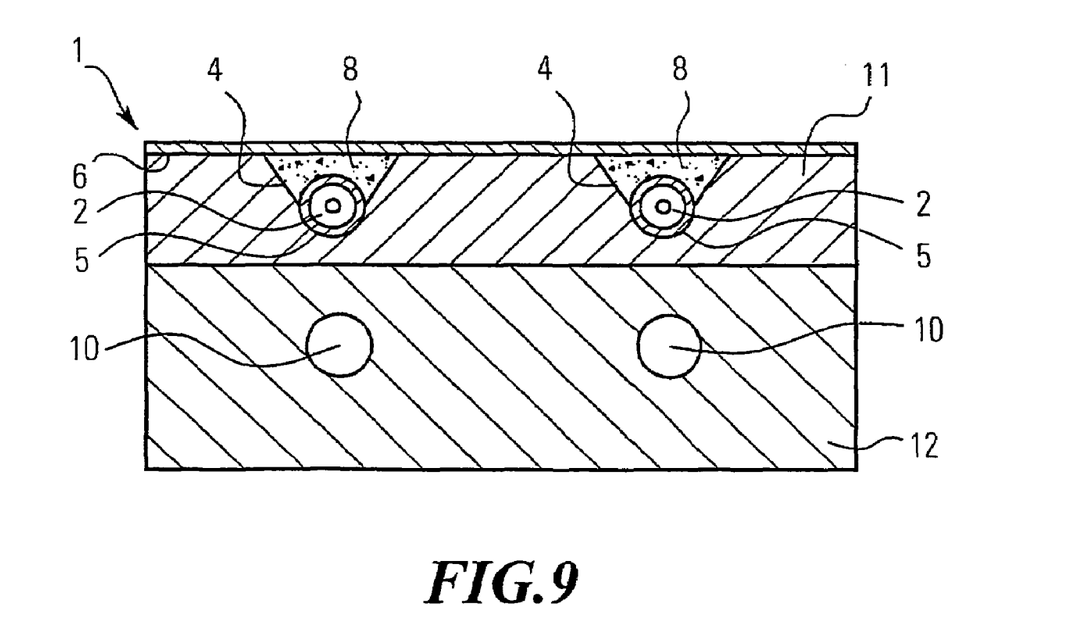
FIG. 9 a cross-section through a another embodiment of the inventive processing device.
Figure 10:
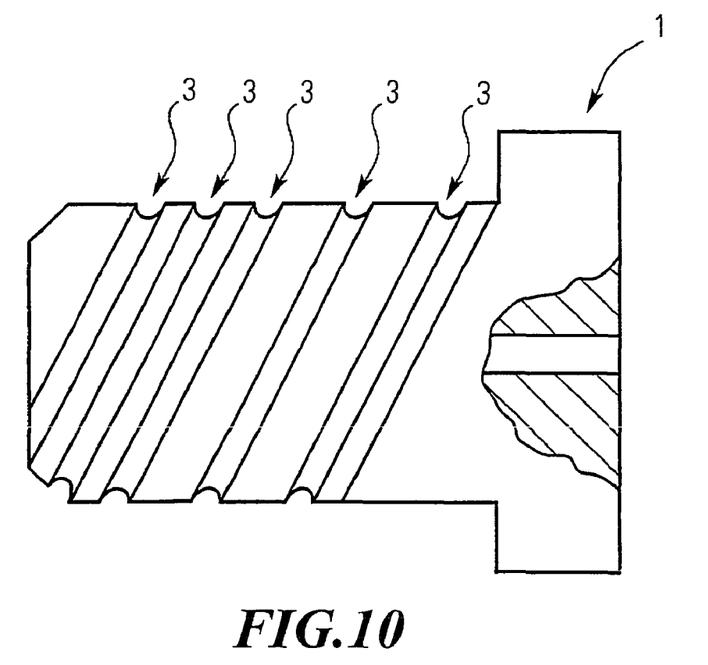
FIG. 10 a cross-section through another embodiment of the inventive processing device prior to inserting the thermal element.
Figure 11:
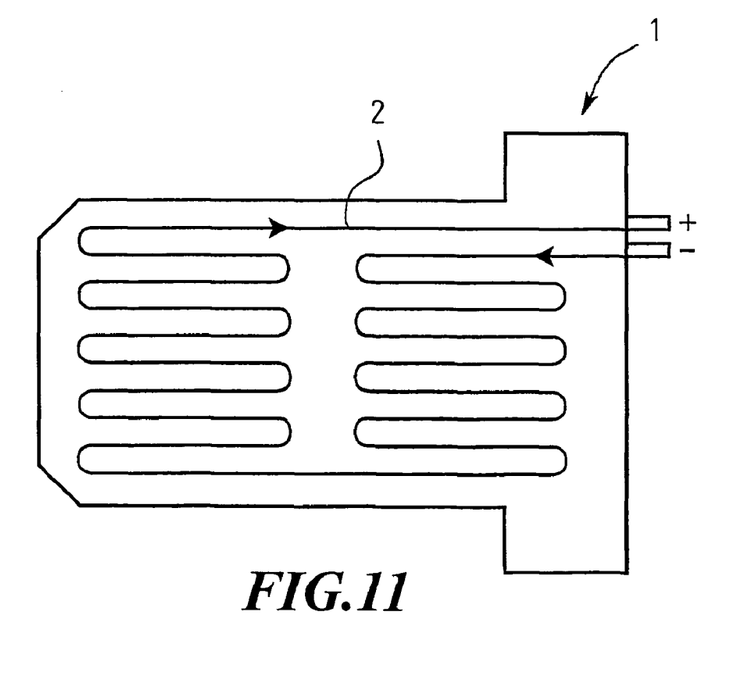
FIG. 11 a cross-section through another embodiment of the inventive processing device.

The embodiment illustrated in FIG. 6 is an injection mold nozzle having a heated insert as processing device 1. Said heated insert comprises a recess 3 in its outer surface having a first portion 4 and a second portion 5. Said recess 3 receives a heating element 2. The clear space 7 between the heating element and the surface 6 is filled with the thermally sprayed material 8. For this embodiment it is important that the surface 6 is processed to be plane so that the processing device 1 can be inserted into the nozzle. FIG. 7 shows a heated bushing as processing device 1 which can be mounted on an injection mold nozzle according to FIG. 8. In FIG. 9, the processing device is a mold manifold having an upper plate 11 comprising the embedded heating element 2. Melt channels 10 are provided in a lower plate 12. The course of the recess 3 and hence of the heating element 2 in the upper plate 11 corresponds to the course of the melt channel 10 in the lower plate 12. FIG. 10 shows an injection nozzle having a spiral shaped groove as recess 3 in its outer surface 6. This nozzle is shown prior to inserting the heating element 2 into the groove. FIG. 11 illustrates an injection nozzle 1 having a heating element 2 which runs substantially longitudinal to the nozzle 1.

From the above it is clear that the invention can be realized on different types of processing devices 1. Furthermore the invention allows to embed elongated thermal elements regardless of the longitudinal form of said elongated thermal element 2.

FIG. 1–5 illustrate the steps of producing a molten material processing device 1 having an elongated thermal element 2. A molten material processing device 1 having a recess 3 in a surface 6 thereof is provided in FIG. 1. The recess 3 has a cross-section, which is larger than a cross-section of the thermal element 2. Further the recess 3 comprises a first portion 4 and a second portion 5 which has a shape corresponding partially to a cross-section of the thermal element 2. The recess 3 can be formed by milling. FIG. 2 shows the step of inserting and pressing the thermal element 2 into the second portion 5 so as to form between the thermal element 2 and the surface 6 of the processing device 1 a clear space 7 limited by the first portion 4 and the thermal element 2. By pressing the thermal element 2 into the recess 3 during its insertion a desired uniform contact between the wall of recess 3 and the thermal element 2 is achieved. In FIGS. 3 and 4 it is seen how the clear space 7 is filled with material 8 by thermal spraying thereby embedding the thermal element 2 in the processing device 1.

The filling of the clear space 7 is carried out by thermal spraying. An initial material, which can be metallic, is thereby molten, atomized and accelerated, and sprayed on the heating element in the form of particles until the clear space 7 is filled. The advantage of this process step consists particularly in that the hot particles stick to the wall of the recess when filling the clear space, such that upon solidification of the layer consisting of the particles covering the heating element, said heating element is firmly fixed in the recess.

The thermal spraying can be carried out in the form of plasma spraying, flame spraying or arc spraying.

In case of plasma spraying, the initial material is introduced into a plasma beam in a powdery form, which beam melts said powder and accelerates it towards the clear space 7. The so formed hot and accelerated particles are thereby sprayed onto the thermal element 2 until the clear space 7 is filled. For producing the plasma beam, an arc is ignited between two non-melting electrodes, to which arc a stabilizing gas is added. The added stabilizing gas, such as $N_2$, $N_2 + \leq 10\% H_2$, Ar, He or $Ar+N_2$ is ionized to form plasma, which exits at high speed from a nozzle in the form of a beam. By means of a carrier gas the powder is blown into said plasma beam, which is molten and cast onto the free surface of the thermal element 2. In this way the heating element can be sprayed on until the clear space 7 is completely filled. In order to obtain a filling as uniform as possible, the particles can be sprayed onto the heating element layer by layer. Due to the high temperature of the plasma beam, most metallic powders, but also other suitable powders can be applied.

In the case of arc spraying the initial material is in wire form. For producing the hot accelerated particles, two electrodes made from the initial material are contacted. After the ignition an arc is formed between said two wires, whereupon the two wires continuously melt. The molten mass is atomized, accelerated and blown onto the free surface of the heating element by means of a current of compressed air. In this way, the heating element can be sprayed on until the clear space 7 is completely filled. In order to obtain a filling as uniform as possible, here too, the particles can sprayed onto the thermal element 2 layer by layer.

As shown in FIG. 5 the surface 6 in which the thermal element is embedded can be processed to be plane for example by milling, lathing and/or grinding.

Aluminum, bronze, copper or nickel have been approved of as initial material.

Figure 12:
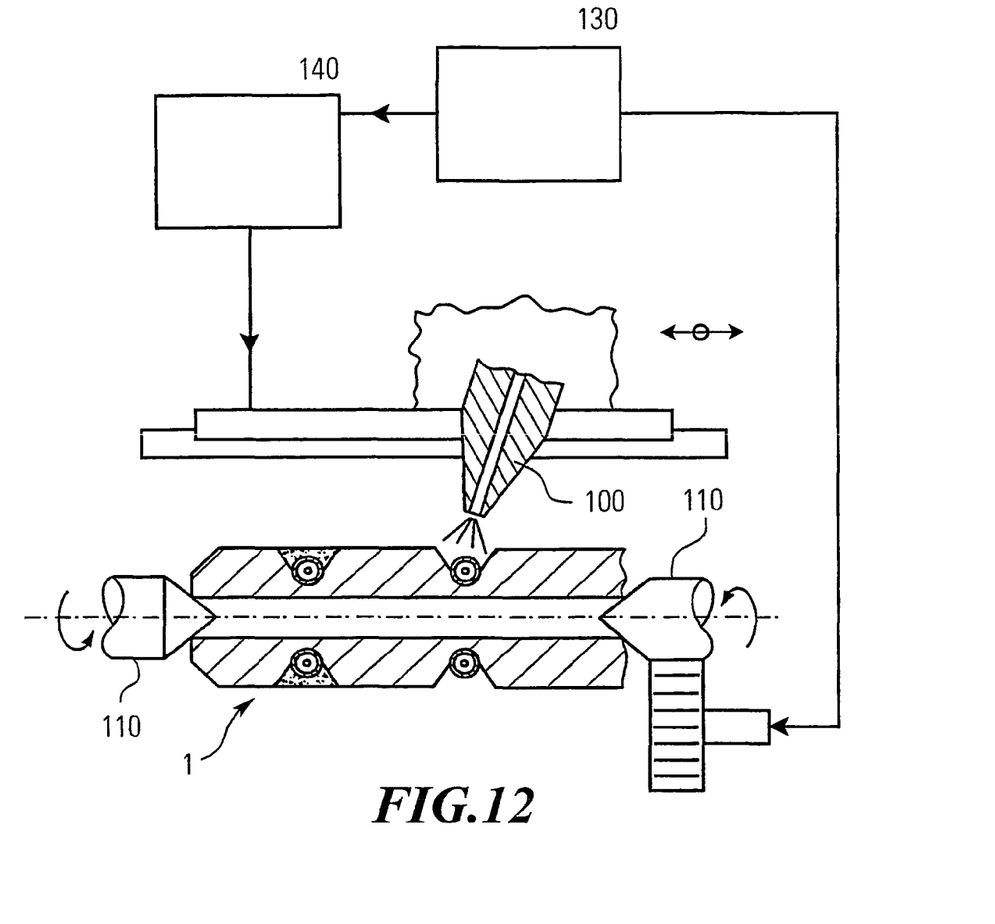
FIG. 12 a schematic illustration of an apparatus for producing an inventive processing device.

FIG. 12 shows an embodiment of an apparatus for producing a molten material processing device 1 having an elongated thermal element 2. This apparatus comprises a thermal spraying equipment 100 consisting for example of a plasma gun. This equipment 100 is movably arranged. Further this apparatus comprises a supporting device 110 for supporting the processing device 1 and a pressing device 120. The pressing device 120 presses the thermal element 2 into the recess 3 in order to maintain a tight contact between the thermal element 2 and the processing device 1 during the thermal spraying. A control device 130 controls the supporting device 110 as well as a driving mechanism 140 which moves the thermal spraying equipment 100.

Figure 13:
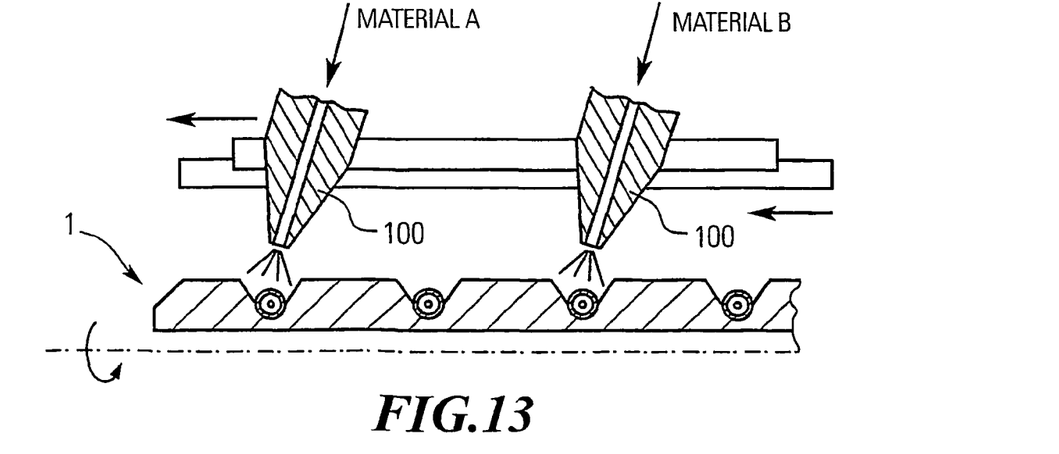
FIG. 13 an embodiment of the apparatus from FIG. 12.

FIG. 13 shows another embodiment of the apparatus in which two plasma guns are provided which each can spray another material onto the thermal element 2. A first material could for example improve the adhesion of a second thermal conductive material on the thermal element 2.

Figure 14:
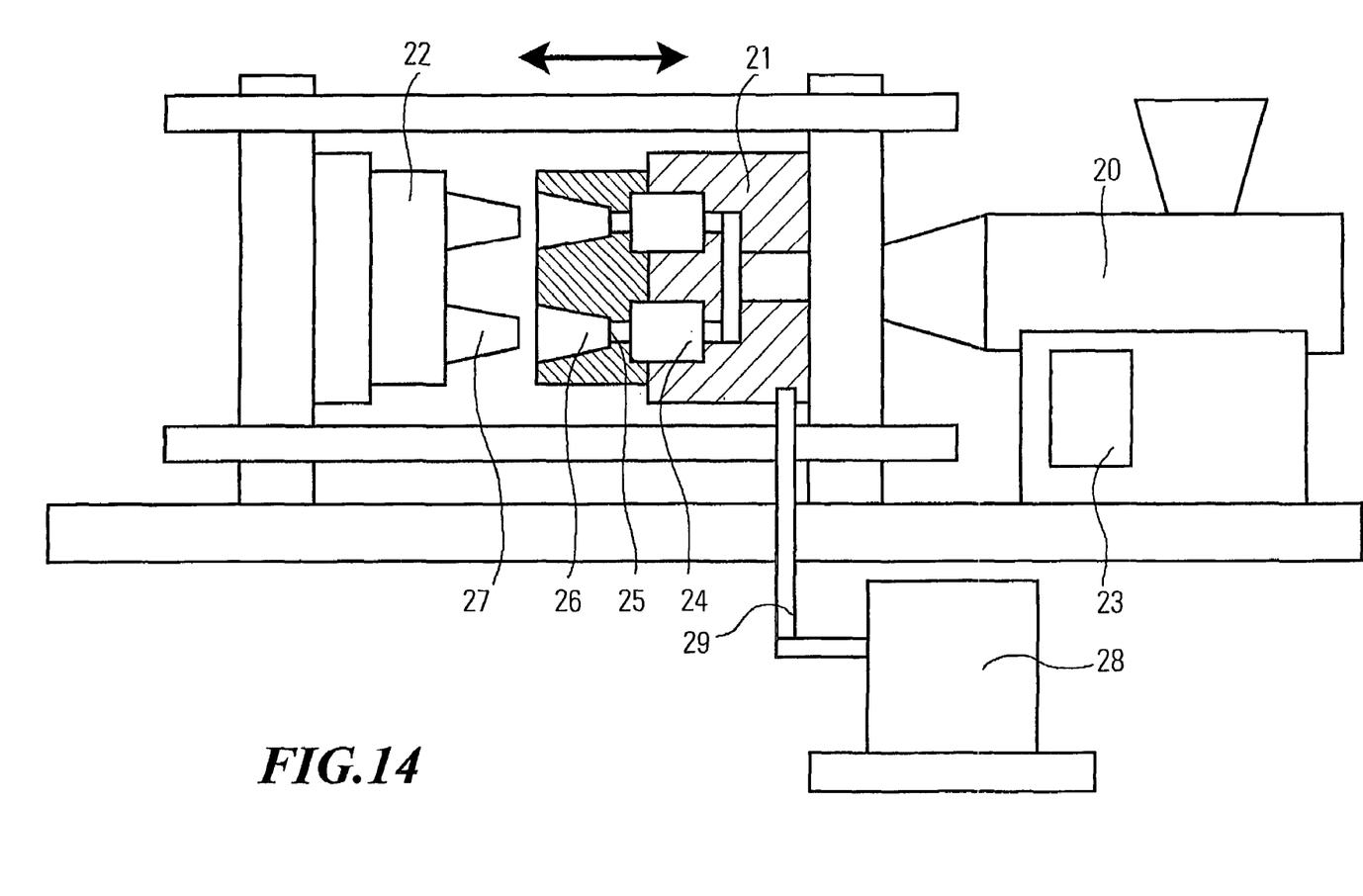
FIG. 14 a schematical side elevation of an injection molding machine partially in cross section.

FIG. 14 shows a schematical illustration of an injection molding machine wherein the embodiments of the processing device described above can be incorporated.

The injection molding machine includes an injection molding extruder 20, which provides for the molding resin as well as a stationary mold half 21 and a movable mold half 22, which is movable with respect to the stationary mold half 21. The stationary mold half 21 and the movable mold half 22 are held in a support frame. The injection molding extruder 20 is controlled by an extruder controller 23. Arranged within the stationary mold half 21 are hot runner injection nozzles 24, which can be constructed as described above in view of the processing device 1. At one end of the hot runner injection nozzle 24 is located the mold gate 25 which leads to the mold cavity 26.

The movable mold half 22 is provided with mold cores 27, which can be inserted into the mold cavities 26.

Especially to control the heat within the hot runner system of the stationary mold half 21, a hot runner controller 28 is provided which is connected through a lead 29 to the stationary mold half 21.

Figure 15:
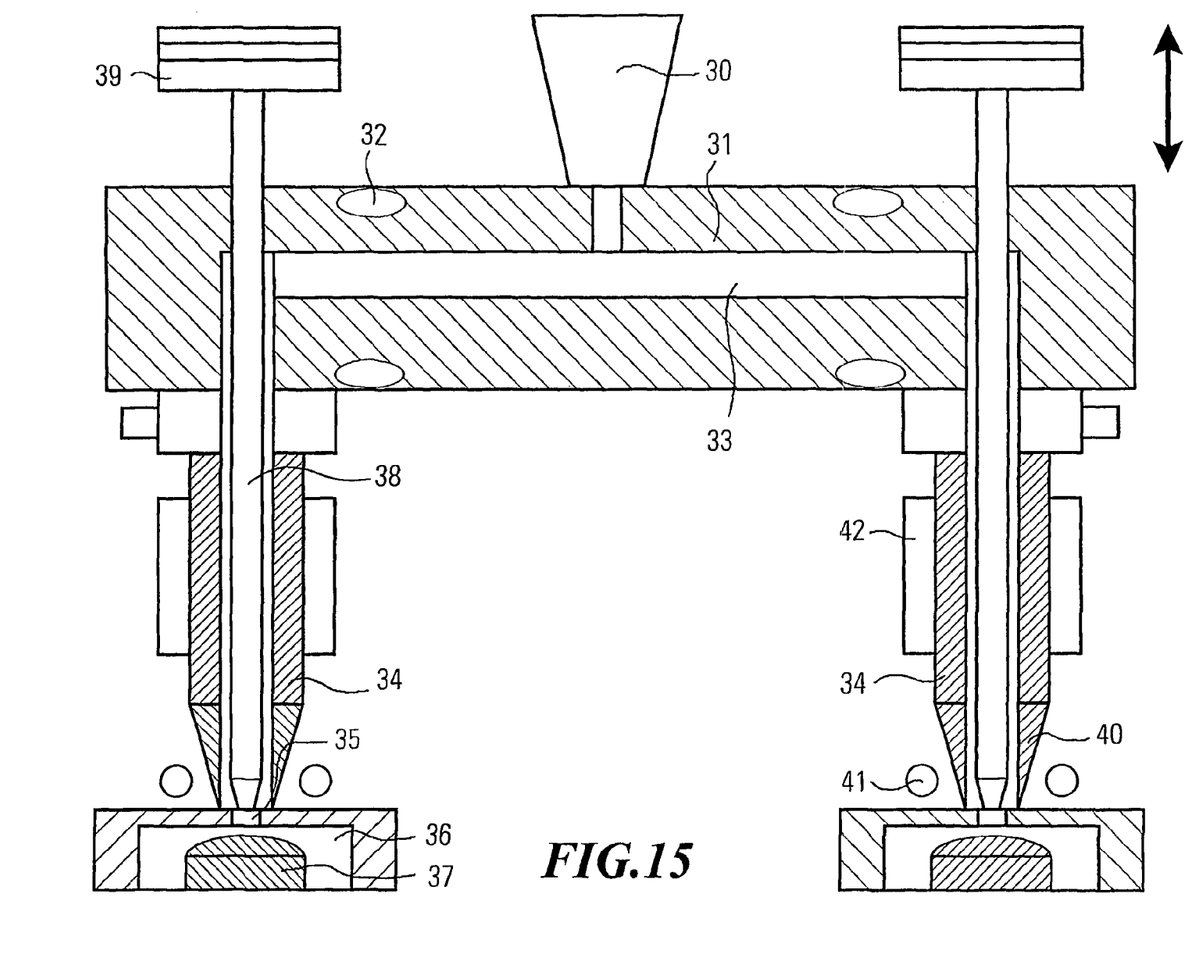
FIG. 15 a schematical cross sectional top view of an injection manifold with a nozzle system.

Turning now to FIG. 15, the injection manifold with the nozzle system is shown in more detail.

A sprue bushing 30 is provided to inject molding resin from the extruder 20 into the mold manifold 31. Embedded within the mold manifold 31 are manifold heaters 32 to keep the temperature within the manifold 31 in the desired temperature range. The channel coming from the sprue bushing 30 is divided into two manifold melt channels 33. This melt channel 33 leads to hot runner nozzle 34 and extends there through to a mold gate 35. Within the mold cavity 36 is located a mold core 37.

A valve pin 38 extends all through a part of the melt channel 33 and is actuated by a valve pin actuator 39 on the rear side of the mold manifold 31.

The hot runner nozzle 34 comprises a nozzle tip and seal assembly 40 to seal the melt channel 33 with respect to the gate 35. Around the area of the gate is arranged a gate cooling channel 41.

The hot runner nozzle 34 is heated by a nozzle heater 42 which is arranged around the circumference of the nozzle 34.

As already indicated above, the injection molding machine shown in FIG. 14 and the injection manifold with a nozzle system shown in FIG. 15 can incorporate a processing device which can be the injection nozzle, the mold manifold, the mold gate insert, the nozzle tip, a sprue bushing, a valve stem, a torpedo or a heater body, which can be of the structure as described in the embodiments above and which can be manufactured by the method also described above.

The invention claimed is:

1. A molten material processing device, comprising:
   a molten material processing device body having a recess formed on a surface therein, the recess including a first portion and a second portion;
   at least one elongated thermal element located in the recess, wherein the recess has a depth that is larger than a height of the thermal element so that a space is created within the recess above the thermal element; and
   a thermally-sprayed material that fills the space,
   wherein opposing sidewalls in the first portion of the recess form a V-shaped opening configured to receive the thermally-sprayed material, and wherein the second portion extends from the first portion and is adapted to a cross-section of the thermal element such that the second portion partially surrounds and directly contacts the thermal element.

2. The molten material processing device according to claim 1, wherein the elongated thermal element is one of a heating element, a thermocouple, a sensor, a heatpipe and a cooling pipe.

3. The molten material processing device according to claim 1, wherein the molten material processing device body is one of an injection nozzle, a mold manifold, a mold gate insert, a nozzle tip, a sprue bushing, a valve stem, a torpedo and a heater body.

4. The molten material processing device according to claim 1, wherein the recess is a groove.

5. The molten material processing device according to claim 1, wherein an opening angle between opposing side walls of the first portion is in a range of 30° to 120°.

6. The molten material processing device according to claim 1, wherein the cross-section of the second portion is arcuate.

7. The molten material processing device according to claim 1, wherein the second portion surrounds the thermal element by an angle of less than 180°.

8. The molten material processing device according to claim 4, further comprising:
   at least one elongated recess formed in a wall of the groove, wherein the elongated recess is formed parallel to a bottom of the groove and is configured such that the walls of the elongated recess act as a spring when the thermal element is pressed into the groove.

9. The molten material processing device according to claim 8, wherein the elongated recess is formed in the first portion.

10. The molten material processing device according to claim 8, further comprising:
    at least one additional elongated recess that is symmetrically formed in an opposite wall of the groove with respect to the first elongated recess.

11. The molten material processing device according to claim 1 wherein the thermally-sprayed material is one of aluminum, bronze, copper, nickel and alloys thereof.

12. A method for producing a molten material processing device comprising the steps of:
    providing a molten material processing device body having a recess in a surface thereof and providing an elongated thermal element, wherein the recess has a cross-section that is larger than a cross-section of the thermal element, and the recess includes a first portion and a second portion;
    pressing the thermal element into the second portion such that a space is created within the recess between the thermal element and the processing device body; and
    thermal spraying a material into the space such that the thermal element is embedded in the processing device.

13. The method for producing a molten material processing device according to claim 12, wherein the thermal element is one of a heating element, a thermocouple, a sensor, a heatpipe and a cooling pipe.

14. The method for producing a molten material processing device according to claim 12, further comprising the step of:
    processing the thermally-sprayed material in which the thermal element is embedded such that the material is flush with the surface of the processing device body.

15. The method for producing a molten material processing device according to claim 14, wherein the processing step includes at least one of milling, lathing and grinding.

16. The method for producing a molten material processing device according to claim 12, wherein the thermal spraying step is performed by at least one of plasma spraying, flame spraying and light are spraying.

17. The method for producing a molten material processing device according to claim 12, wherein the thermal spraying step is repeated such that multiple layers of thermally-sprayed material are deposited into the space.

18. The method for producing a molten material processing device according to claim 12, further comprising the step of:
    cleaning the recess prior to performing the step of pressing the thermal element into the second portion.

19. An apparatus for producing a molten material processing device, comprising:
    thermal spraying equipment;

a supporting device for supporting a molten material processing device body;

a pressing device for pressing a thermal element into a recess in a surface of the processing device body; and a control device, wherein the thermal spraying equipment and the supporting device are movably arranged and controlled by the control device to cooperate with each other such that a thermally-sprayed material is sprayed into the recess, thereby embedding the thermal element after the thermal element is pressed into the recess by the pressing device.

20. The apparatus for producing a molten material processing device according to claim 19, wherein the elongated thermal element is one of a heating element, a thermocouple, a sensor, a heatpipe and a cooling pipe.

21. A molten material processing device, comprising:

a molten material processing device body;

a thermal element recess including at least one second recess formed in a wall of the thermal element recess, the thermal element recess being located in a surface of the processing device body; and at least one elongated thermal element located in the thermal element recess, wherein the thermal element recess has a depth which is larger than a width of the thermal element so that a space is created within the thermal element recess between the thermal element and the surface of the processing device body, wherein a lower portion of the thermal element recess is adapted to partially surround and directly contact the thermal element, and wherein the second recess is located adjacent to the thermal element and is configured such that a wall of the second recess acts as a spring when the thermal element is pressed into the thermal element recess.

22. The molten material processing device according to claim 21, further comprising:

at least one additional second recess formed in a wall of the groove.

23. The molten material processing device according to claim 1, wherein a distance between the opposing sidewalls in the first portion of the recess decreases from a first distance at the surface of the processing device to a second distance at a location adjacent to the thermal element.

* * * * *